Figure 1:
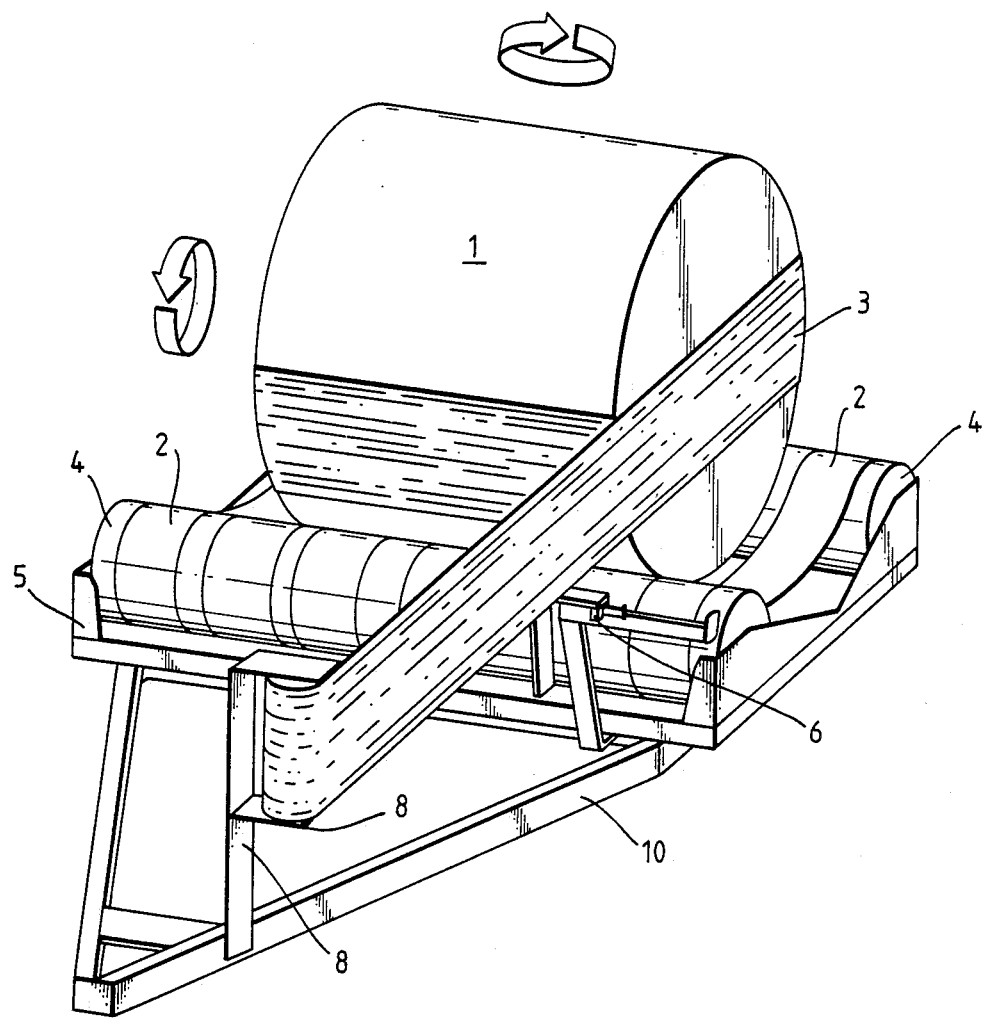

United States Patent [19]

Haugstad

[11] Patent Number: 4,972,656

[45] Date of Patent: Nov. 27, 1990

[54] AUTOMATIC ROUND BALE WRAPPER

[75] Inventor: Jahn E. Haugstad, Vigrestad, Norway

[73] Assignee: Underhaug A/S, Nerbo, Norway

[21] Appl. No.: 428,849

[22] Filed: Oct. 30, 1989

[30] Foreign Application Priority Data

Oct. 31, 1988 [NO] Norway ............................ 884841

[51] Int. Cl.$^5$ ............................................ B65B 11/04
[52] U.S. Cl. ........................................ 53/176; 53/556; 53/211
[58] Field of Search .................. 53/170, 176, 556, 587, 53/118, 211

[56] References Cited

U.S. PATENT DOCUMENTS

| 4,077,179 | 3/1978 | Lancaster | 53/211 X |
| 4,685,270 | 8/1987 | Brambilla | 53/211 X |
| 4,815,369 | 3/1989 | Akins | 53/587 X |

FOREIGN PATENT DOCUMENTS

| 2056401 | 3/1981 | United Kingdom. | |
| 2159489 | 12/1985 | United Kingdom | 53/211 |
| 2200090 | 7/1988 | United Kingdom | 53/587 |

Primary Examiner—John Sipos
Attorney, Agent, or Firm—Nixon & Vanderhye

[57] ABSTRACT

A round bale wrapper for packing feed, like green forage and straw, intended for ensilage of the feed and conservation of the straw. The round bale is made to turn both about a substantially horizontal and a substantially vertical axis. The round bale wrapper comprises a round bale table, a chassis with round bale table being tiltable relative to the latter, and a packing sheet dispensing means which is externally provided relative to round bale table. For continuous automatic packing of round bales the round bale wrapper comprises means for clamping and cutting sheet which is located between the round bale, and the sheet dispensing means. At a predetermined point of time or tilting angle during the tilting movement of round bale table clamping and cutting means operate sequentially. Upon cutting of the sheet the latter is still firmly held in the clamping means, and the sheet is held during at least one revolution of the round bale table as a first step of packing the next round bale.

10 Claims, 5 Drawing Sheets

AUTOMATIC ROUND BALE WRAPPER

The present invention relates to an automatic round bale wrapper, especially intended for round bale ensilage of feed for conservation and packing of straw. The round bale wrapper is described in more detail in the preamble of the following independent claim.

In agriculture, treatment of green forage, like raw gras and straw, packed in round bales is becoming more and more common as opposed to ensilage in traditional silo plants. For round bale ensilage a sheet, preferably a plastic sheet, is wrapped around the bales and the latter may be stored outdoors. Round bale ensilage also has advantages environmental aspects, discharge of silage effluent being substantially avoided at the same time as use of chemicals is drastically reduced.

From EP Patent Application No. 0208034 a round bale wrapper is known, where the round bale is supported by two rollers mounted on a turntable which rollers are causing the round bale to turn around a substantially horizontal axis. The turntable is rotatable relative to a base to cause rotation of the round bale about a substantially vertical axis. After wrapping the turntable may be tilted relative to its base to permit the round bale to roll off.

GB Patent Application 2 191 984 shows a similar round bale wrapper comprising means for adjusting the degree of sheet overlapping.

A limitation of the above discussed approaches is that every time packing of a round bale is finished, the operator has to step down from the traction vehicle, e.g. a tractor, to cut the sheet and secure it to the round bale. To start wrapping another round bale, the operator also had to fasten the sheet on the round bale by hand. Then the operator may start the round bale wrapper.

By means of the round bale wrapper according to the invention manual handling should be avoided and, it should, thus, be possible to pack a larger number of round bales per time unit.

Another important object of the present invention also was to provide an automatic round bale wrapper utilizing the motional functions that are already present. This means that use of further sources of energy, e.g. hydraulic and electric energy, from the vehicle and to the rotating portion of the round bale wrapper should be avoided.

According to the invention this is achieved by an automatic round bale wrapper of the above mentioned kind, which is characterized by comprising means for clamping and cutting the sheet, which means is located between the round bale and the sheet dispensing means, the clamping and cutting means initiates operation at a predetermined time or tilting angle during the tilting movement of the round bale table.

Suitably, the clamping and cutting means comprise a support for the sheet which, during tilting movement of the round bale table will cause the sheet to be collected into a string in the cutting area, as well as a cutting tool. The sheet support and the cutting tool was movable relative to each other, and preferably in parallel with one another.

Advantageously, the cutting tool may be firmly attached to the round bale table and, thus, the sheet support is movably mounted. The sheet support may advantageously be provided with a sheet stopper to prevent the sheet from sliding off the sheet support.

The means for holding or clamping the sheet may, suitably, comprise a sheet abutment member with which the sheet is contacted before cutting. Such abutment of the sheet has a special effect as regards subsequent wrapping of the next round bale, the sheet end being firmly held until the round bale has made at least one revolution, whereupon it is "self-locked" to the round bale.

The sheet abutment member is, advantageously, movable against a resilient material or a spring over a predetermined distance with the abutment member moving in parallel with the sense of movement of the sheet support and the sheet stopper.

The clamping and cutting means may be activated by a trigger mechanism which is connected to the chassis. The round bale wrapper may also comprise a winding mechanism for tensioning the clamping and cutting means for the next triggering. The winding mechanism may, e.g. tension the clamping and cutting means stepwise at each revolution of the round bale table about the substantially vertical axis. Such a winding mechanism may be implemented in various designs.

Figure 2:
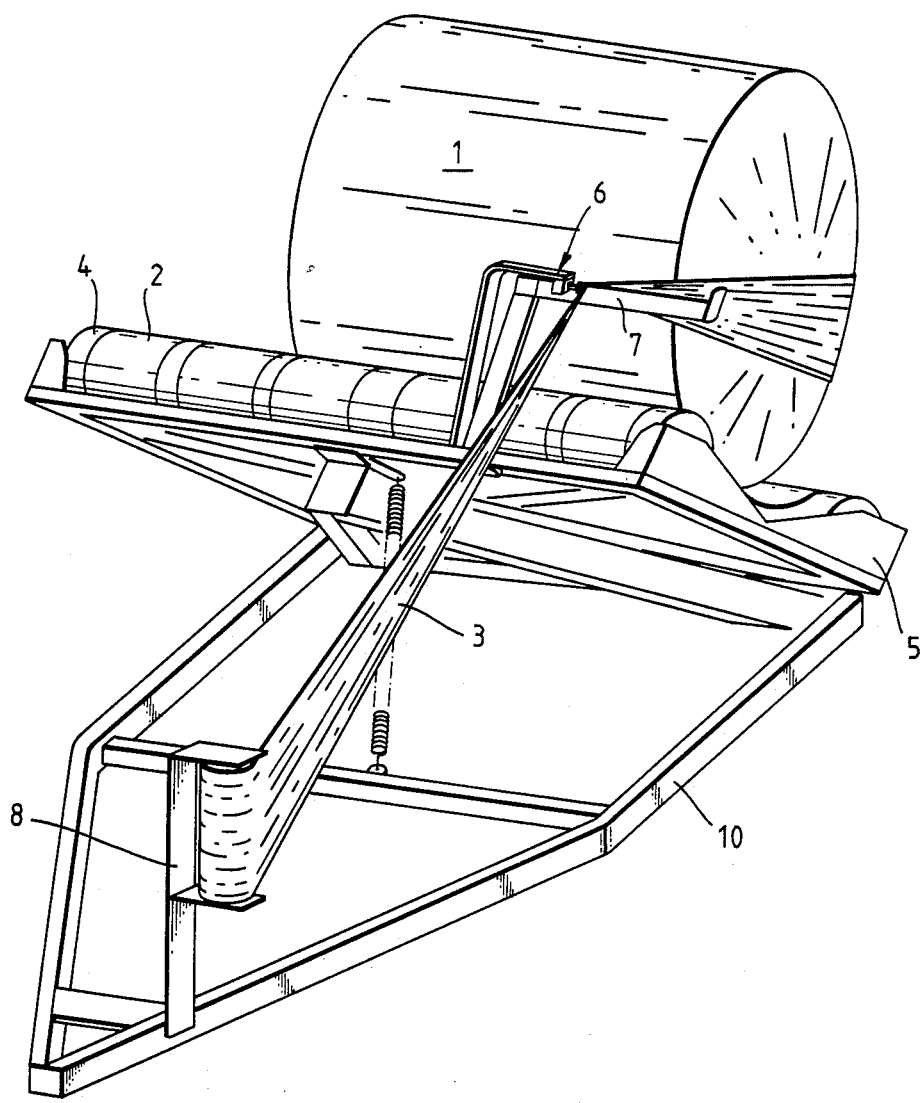
Figure 3:
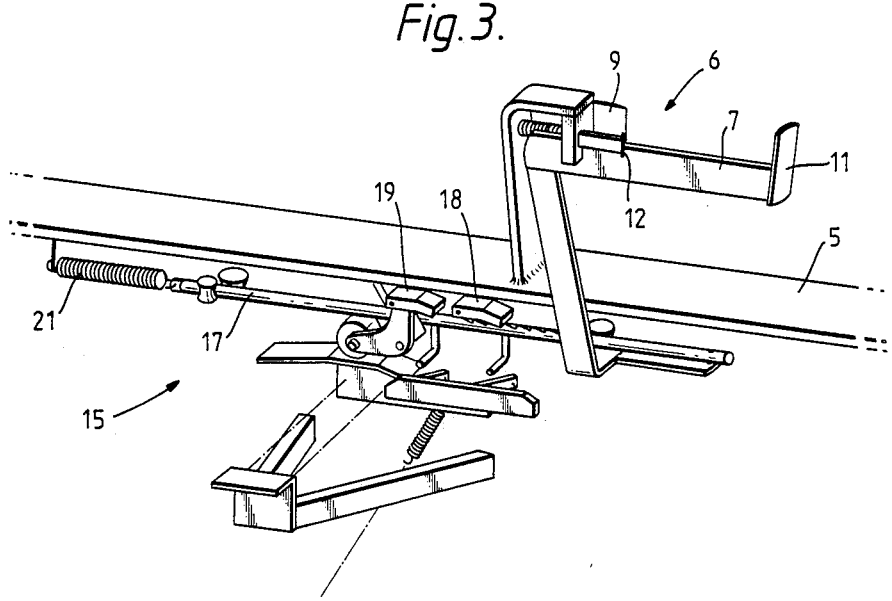
Figure 4:
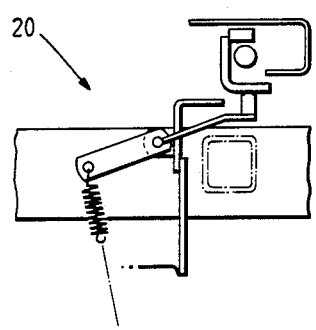
Figure 5:
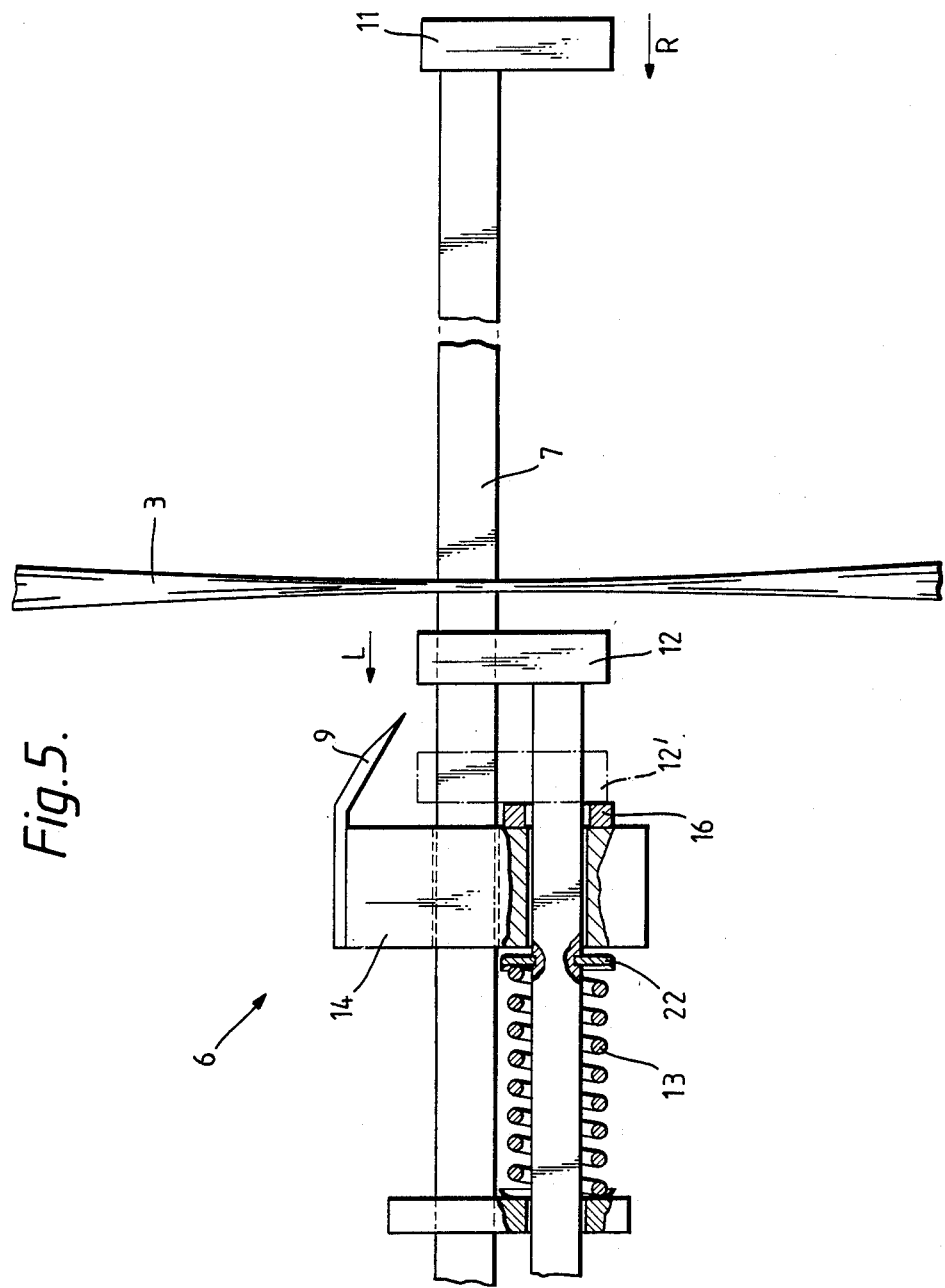
Figure 6:
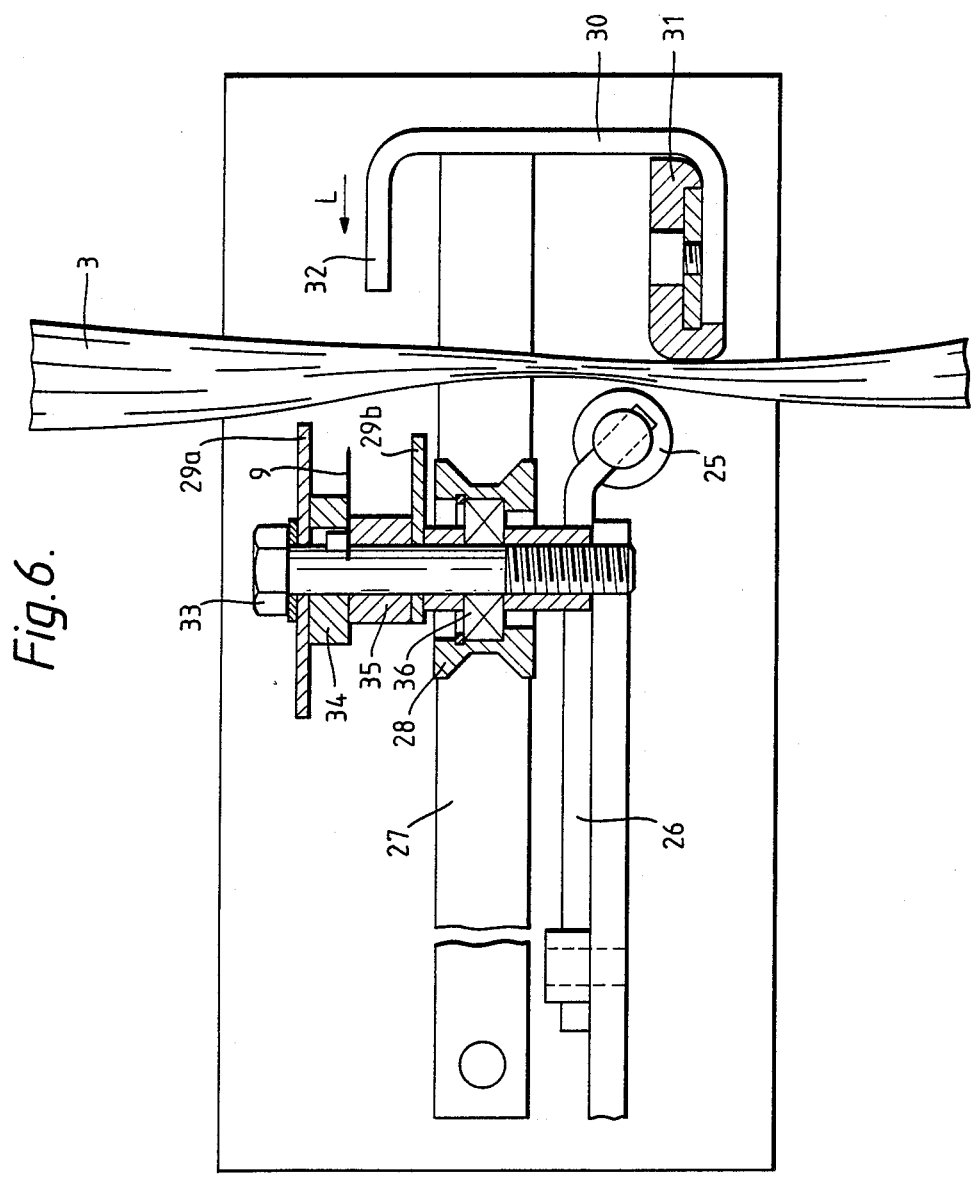

Other and further objects, features, and advantages will appear from the following disclosure of an embodiment of the invention which is at present preferred, and is shown for illustrative non-limiting reasons in the attached drawings, where FIG. 1 is a simplified perspective view of a round-bale wrapper which is provided with a clamping and cutting means according to the invention, FIG. 2 shows the round bale wrapper according to FIG. 1 with the clamping and cutting means in action, FIG. 3 is a perspective view of an embodiment of the clamping and cutting means according to the invention, FIG. 4 is an elevational view of an embodiment of a trigger mechanism for use with the present invention, FIG. 5 is a diagrammatical top view showing the clamping and cutting means according to FIG. 3 in more detail, and FIG. 6 is a top view of an alternative embodiment of the clamping and cutting means according to the invention.

With reference to FIG. 1, a round bale wrapper is shown, the mean features of which are known per se. A chassis 10 may be connected with a traction vehicle (not shown), e.g. a tractor, or the like. The round bale wrapper may be of a kind that is firmly mounted to the driving vehicle, or it may be provided with wheels for being towed behind the driving vehicle. It may also be a stationary round bale wrapper. On chassis 10 a round bale table 5 is mounted to be rotatable about a substantially vertical axis. Round bale table 5 is also tiltable relative to chassis 10 by means of a working cylinder (not shown) or the like. In the shown embodiment round bale table 5 comprises two rollers 4, and one or a number of belts 2 running between the rollers. One roller 4 is supplied with driving force which will cause movement of belts 2, which movement is in turn transmitted to the round bale 1 and will cause the latter to turn about a substantially horizontal axis. By harmonizing rotation about the substantially vertical axis and the substantially horizontal axis, packing of round bale 1 is achieved with more or less overlap of the stretch film or sheet 3. Sheet 3 is supplied from a sheet dispensing means 8, which is mounted externally of the round bale table 5, preferably on chassis 10. The above disclosed manner of packing is known per se and will not be discussed in detail here.

FIG. 2 shows the round bale wrapper according to FIG. 1, with round bale table 5 tilted relative to chassis 10. Means 6 for holding and cutting sheet 3 is shown at the moment when it starts operating. As shown, sheet 3 is collected on a sheet support 7 to form a narrow string in the cutting area. It should be observed that the tilting movement of round bale table 5 is utilized to this aim.

FIG. 3 shows an embodiment of clamping and cutting means 6 which is mounted on round bale table 5. Clamping and cutting means 6 comprises sheet support 7 which has a sheet stopper 11 mounted on one end. The clamping means also comprises a sheet abutment member 12 which sheet 3 is made to contact before cutting operations. A cutting tool 9, e.g. in the shape of a cutting edge, is mounted to be stationary relative to round bale table 5 in the shown embodiment. Sheet support 7 is mounted to be movable relative to cutting tool 9 and, thus, round bale table 5 in the shown embodiment.

FIG. 5 is a more detailed view of an embodiment of clamping and cutting means 6. As mentioned above, sheet 3 will be collected during the tilting movement of round bale table 5 to form a string on sheet support 7. Sheet support 7 has a certain extension to ensure that the sheet is caught against the support 7. To prevent the sheet from sliding off support 7, the latter is provided with a stopper 11 at one end. When sheet 3 has been collected in a string on support 7, the cutting operation may take place. In the shown embodiment sheet support 7 is caused to move in the direction of arrow R. Sheet 3 is, thus, pulled into contact with sheet abutment 12, and the sheet is clamped against abutment 12 by means of sheet stopper 11. As indicated in FIG. 5, sheet support 7 with sheet stopper 11 is movable relative to abutment 12. Upon the sheet 3 being clamped between abutment 12 and stopper 11, stopper 11 will take along abutment 12 and sheet 3, with the new position 12" indicated by dashed lines in FIG. 5. The sense of movement L is indicated by an arrow in the Figure. During this movement sheet 3 is guided towards cutting tool 9 and is cut immediately adjacent the side facing the round bale. It should be mentioned that after cutting, sheet 3 is still firmly held between abutment 12 and stopper 11 on the side facing the sheet dispensing means 8.

FIG. 4 shows a trigger mechanism 20, which is a predetermined point of time or angle will actuate the above mentioned clamping and cutting means 6. This trigger mechanism 20 may be of any suitable kind, and FIG. 4 just illustrates one manner of doing this. What is essential, however, is that the trigger mechanism 20 is activated, via a connection with chassis 10 at a predetermined point of time or angle during the tilting movement of round bale table 5.

FIG. 6 is an alternative embodiment of the clamping and cutting means. Similar to the FIG. 5 embodiment, the sheet 3 will be collected during the tilting movement of the round bale table 5 to form a string on the sheet support 27. The sheet support 27 has a certain length to ensure that the sheet is caught against the support 27. At one end of the support 27 a stopper 30 is provided. A rubber pad or similar friction material is replaceably mounted to the stopper 30 in addition to a hold 32. The sheet support 27 is longitudinally moveable towards (L) and from a friction roller 25 and a fixed cutting edge 9, which support 27 is guided between opposing guide rollers 28 (only the upper is shown in FIG. 6) mounted on respective bearings 36. The friction roller 25 is mounted on a resilient bar 26, which enables the roller 25 to move resiliently transverse to the direction of movement of the support 27 as the pad 31 engages the roller 25. The sheet 3 will be entrapped and retained between the roller 25 and the pad 31 simultaneously to hold 32 pushes the sheet against the edge 9 as the sheet 3 is stretched between the holds 29a 29b. A bolt 33 is attaching the cutting and clamping means to the round bale table 5. The cutting edge 9 is replaceably fixed between two spacer blocks 34, 35 by means of the bolt 33. The cutting operation is further similar to the FIG. 5 embodiment. As will appear from FIG. 3, the round bale wrapper can also comprise a winding and release mechanism 15, which will tension the clamping and cutting means 6 before the next cutting operation may be carried out. Said winding mechanism 15 may be implemented in a number of different manners and mechanism 15 shown in FIG. 3 is just shown as an example. The shown winding mechanism 15 comprises a rack rail 17 in which support 7 is mounted, a locking pawl 18, and a driving pawl 19. For each complete revolution of round bale table 5 about the substantially vertical axis driving pawl 19 is activated to push the rack rail 17 one step in a direction for tensioning support 7 and stopper 11 by the aid of spring 21. The number of tensioning steps may, if desired, be adapted to the number of revolutions of round bale table 5, so that mechanism 15 is wound-up at the latest when a round bale 1 is completely wrapped.

To illustrate the automatic application of plastic film onto the next round bale to be packed, reference is again made to FIG. 5. As mentioned, the film 3 is kept in a clamped state between abutment 12 in position 12' and sheet stopper 11 after the cutting operation. With the sheet is firmly held in this manner, round bale table 5 is turned about the substantially vertical axis which causes sheet to be pulled or wrapped a first time around round bale 1. This occurs with round bale table 5 in a substantially horizontal position. After slightly more than one revolution of the round bale table 5 so that sheet 3 overlaps and holds the leading end of the sheet, winding mechanism 15 will tension clamping and cutting means 6, and after a predetermined number of ratching or locking steps the sheet stopper 11 will move off from abutment 12 and, thus, release sheet 3. As shown in FIG. 5, a damping means 16, e.g in form of a rubber pad, is provided between the abutment member and a holder 14. A spring 13 pushing against a spring washer 22 which is secured to an extension of abutment 12 will cause a tensioning force on abutment 12 in a direction opposite to direction L. As will appear from FIG. 5, sheet 3 is not released until stopper 11 and abutment 12 have returned to their original positions shown in full lines. By adapting this function with that of the winding mechanism 15 it is possible to predetermine the release of the held sheet 3 by adapting the number of locking steps to the number of revolutions of the round bale table 5.

Substantial emphasis is provided in order to allow firm clamping and cutting of the sheet by means of motion and functions already present in a round bale wrapper. Especially the tilting movement of the round bale table 5 as well as its rotation about a substantially vertical axis are, thus, utilized. Consequently, it was not necessary to provide the round bale wrapper with hydraulic or electric equipment which would have to be transferred to round bale table 5 and would, thus, become more complicated and expensive. In order to protect dangerous portions of the wrapper it will be provided with various protecting means and covers.

The round bale wrapper may also be provided with additional equipment in form of electronic sensors recording the number of revolutions of the round bale. This may be suitable if a certain number of revolutions of the round bale table is required.

Having described my invention, I claim:

1. An automatic round bale wrapper which makes the round bale turn both about a substantially horizontal and a substantially vertical axis, comprising a round bale table, a chassis, relative to which round bale table is tiltable, and a packing-sheet dispensing means which is external relative to the round bale table, characterized in that said wrapper comprises means to clamp and cut the sheet between the round bale and the sheet dispensing means, on which support 7 is mounted at a predetermined point of time or tilting angle of said round bale table.

2. A round bale wrapper as stated in claim 1, characterized in that clamping and cutting means comprise a support for sheet, which causes sheet to be collected to a string in the cutting area during said tilting movement, and a cutting tool, said sheet support and cutting tool being movable relative to each other.

3. A round bale wrapper as stated in claim 2, characterized in that said cutting tool is firmly secured to round bale table, and that sheet support is movably mounted and is provided with a sheet stopper.

4. A round bale wrapper as stated in claim 2, characterized in that the means for clamping the sheet comprise a resilient friction roller and a friction pad, which roller and pad is movable relative each other.

5. A round bale wrapper as stated in claim 2, characterized in that the means for clamping the sheet comprise a sheet abutment against which sheet is placed before being cut.

6. A round bale wrapper as sited in claim 5, characterized in that sheet abutment is movable against spring force along a predetermined distance in parallel with the direction of movement of sheet support and sheet stopper.

7. A round bale wrapper as stated in claim 2, characterized in that clamping and cutting means are activated by a trigger mechanism in connection with the chassis.

8. A round bale wrapper as stated in claim 2, characterized in that it comprises a winding mechanism for tensioning clamping and cutting means before the next triggering action.

9. A round bale wrapper as stated in claim 8, characterized in that winding mechanism tensions clamping and cutting means stepwise at each revolution of round bale table about the substantially vertical axis.

10. A round bale wrapper as stated in claim 9, characterized in that winding mechanism releases the holding means at the earliest in the first tensioning step.

* * * * *

UNITED STATES PATENT AND TRADEMARK OFFICE
CERTIFICATE OF CORRECTION

PATENT NO. : 4,972,656

DATED : November 27, 1990

INVENTOR(S) : Jahn E. Haugstad

It is certified that error appears in the above-identified patent and that said Letters Patent is hereby corrected as shown below:

Column 5:

Claim 1, lines 15 and 16, delete "on which support 7 is mounted" and insert --and means to initiate sequential operation of said means to clamp and cut the sheet during the tilting movement of the round bale table--

Signed and Sealed this

Twenty-third Day of June, 1992

Attest:

DOUGLAS B. COMER

*Attesting Officer*  *Acting Commissioner of Patents and Trademarks*